US006847437B2

United States Patent
Bruel et al.

(10) Patent No.: US 6,847,437 B2
(45) Date of Patent: Jan. 25, 2005

(54) LASER ANEMOMETER

(75) Inventors: Christine Bruel, Cornas (FR); Hubert Combe, Toulaud (FR)

(73) Assignee: THALES, Paris (FR)

( * ) Notice: Subject to any disclaimer, the term of this patent is extended or adjusted under 35 U.S.C. 154(b) by 0 days.

(21) Appl. No.: 10/450,626

(22) PCT Filed: Dec. 11, 2001

(86) PCT No.: PCT/FR01/03930

§ 371 (c)(1),
(2), (4) Date: Jun. 17, 2003

(87) PCT Pub. No.: WO02/50565

PCT Pub. Date: Jun. 27, 2002

(65) Prior Publication Data
US 2004/0036852 A1 Feb. 26, 2004

(30) Foreign Application Priority Data

Dec. 21, 2000 (FR) .......................................... 00 16778

(51) Int. Cl.$^7$ ................................................ G01P 3/36
(52) U.S. Cl. .................................................... 356/28.5
(58) Field of Search ................................. 356/28, 28.5

(56) References Cited

U.S. PATENT DOCUMENTS

| | | | | | |
|---|---|---|---|---|---|
| 4,569,588 | A | * | 2/1986 | Nishiwaki et al. | 356/28.5 |
| 4,637,716 | A | * | 1/1987 | Auweter et al. | 356/28.5 |
| 5,013,928 | A | * | 5/1991 | Ikeda et al. | 250/574 |
| 5,090,801 | A | * | 2/1992 | Johnson | 356/28.5 |
| 5,172,181 | A | * | 12/1992 | Morbieu et al. | 356/28.5 |
| 5,202,558 | A | * | 4/1993 | Barker | 250/227.21 |
| 5,351,116 | A | * | 9/1994 | Barton et al. | 356/28.5 |
| 5,587,785 | A | * | 12/1996 | Kato et al. | 356/28.5 |
| 5,684,572 | A | * | 11/1997 | Butefisch | 356/28.5 |
| 6,141,086 | A | * | 10/2000 | Vahala et al. | 356/28.5 |
| 6,570,647 | B1 | * | 5/2003 | Meili | 356/28 |
| 6,580,497 | B1 | * | 6/2003 | Asaka et al. | 356/28.5 |

FOREIGN PATENT DOCUMENTS

| | | |
|---|---|---|
| FR | 2 659 452 A | 9/1991 |
| FR | 2 761 162 A | 9/1998 |

* cited by examiner

*Primary Examiner*—Bernarr E. Gregory
*Assistant Examiner*—Brian K Andrea
(74) *Attorney, Agent, or Firm*—Lowe Hauptman Gilman & Berner LLP.

(57) ABSTRACT

The present invention relates to a laser anemometer making it possible to determine the relative velocity between the anemometer and an ambient medium. The architecture of the anemometer includes a laser source, emission and reception optics for focusing a laser beam onto a measurement zone containing particles in suspension in the ambient medium and for receiving the radiation back-scattered by the particles. It also includes an optical mixer for mixing the received radiation and reference radiation representing the radiation emitted by the source, and a detector at the output of the mixer. The relative velocity between the anemometer and the ambient medium is determined by computation on the basis of the Doppler effect generated by the radiation and detected by the detector. The laser source is located remotely from a common support which carries the optical emission and reception system as well as the mixer. It is connected to this common support by at least one optical fiber. The detector is also remotely located and connected by at least one optical fiber. The main emission channel of the emission and reception system carried by the support is produced with the aid of unguided optics.

20 Claims, 2 Drawing Sheets

US 6,847,437 B2

LASER ANEMOMETER

RELATED APPLICATION

The present application is based on, and claims priority from, French Application Serial No. 01/03930, filed Dec. 11, 2001, the disclosure of which is hereby incorporated by reference herein in its entirety.

FIELD OF THE INVENTION

The present invention relates to laser anemometers, that is to say instruments for measuring the velocity of air or velocity with respect to air, which use the following principle: illumination at a distance, using a beam of generally infrared laser light, of a region in space containing particles or dust in suspension (which are naturally present or intentionally injected into this region, and also referred to as aerosols), reflection of the light from the particles, optical detection of the beam reflected towards the source, and electronic processing in order to determine by calculation a relative velocity between the source-detector assembly, on the one hand, and the particles, on the other hand.

BACKGROUND OF THE INVENTION

Laser anemometers are used in particular in aircraft for measuring the velocity of the aircraft with respect to the ambient air which contains natural particles in suspension. One of the advantages of laser anemometers over the anemometric probes which measure pressure is that they make it possible to measure the velocity with respect to the ambient air but not directly on the surface of the aircraft, but at a certain distance from this surface, where the air is disturbed less by the aircraft itself or even not disturbed at all.

Distinction is made between two main types of laser anemometers: transverse-measurement anemometers and longitudinal-measurement anemometers.

Transverse-measurement anemometers emit two beams of coherent light, which are slightly inclined relative to one another and which interfere in a measurement zone (for example at a distance of about one metre from the emission optics). Plane-parallel interference fringes are produced in this zone, and a particle which crosses these fringes undergoes illumination with a sinusoidal overall intensity; it therefore reflects a quantity of light which varies sinusoidally. The frequency of this variation depends on the velocity component of the particle in the direction perpendicular to the plane of the interference fringes. This direction is situated in the plane defined by the two inclined beams and perpendicular to the bisector of these two beams. These anemometers therefore measure a velocity component which is transverse with respect to the overall axis of the beams.

Longitudinal-measurement anemometers operate on a different principle. They emit a single laser beam and measure the relative-velocity component of the particles in the direction of the optical axis of this beam. The beam is focused by emission optics at a large distance (for example 50 metres) into a measurement volume where the illuminated particles will return a small fraction of energy towards the source in coherence with the emission beam but with a Doppler-type shift in respect of the optical frequency, which is due to the velocity component of the particles in the return axis of the reflected beam. The detection consists in making the backscattered coherent light interfere with a fraction of the emitted beam, and in producing intensity beats at an electronically detectable frequency. The electronic signal is then processed in order to extract a frequency spectrum from it and to deduce from this spectrum a statistically dominant component which represents the average velocity of the particles with respect to the anemometer in the direction of the optical axis. These longitudinal-measurement anemometers make it possible to measure the velocity of an aircraft with respect to an ambient-air zone which is far away from the aircraft, and which is therefore disturbed little by it, whereas transverse-measurement anemometers observe the air at a distance of no more than about one metre, and therefore in practice in a turbulent atmosphere.

When it is desired to measure a complete velocity vector, use is made of three successive or simultaneous anemometric measurements whose optical axes are oriented along three known directions (for example three orthogonal directions), and the velocity vector is determined according to its three components. More measurements (for example four) may be used in order to obtain redundancies which reduce the measurement error of the velocity vector. This is typically the case in an aircraft where the velocity with respect to the air both in the horizontal plane and along a vertical axis is useful.

One drawback of laser anemometers compared with simple pressure-measurement probes is that they are bulky and, for this reason, difficult to install in aircraft. For example, it is not easy to find a place on the aircraft where, on the one hand, there is space to install the anemometer and, on the other hand, the three objectives do in fact point towards directions of interest, which are preferably orthogonal.

It is consequently an object of the invention to design an anemometer which can be installed as easily as possible while taking into account the constraints dictated by the environment.

For this purpose, it has already been proposed in Patent FR-A-2 659 452 to place the laser source, and its focusing optics, at a distance from the interferometric-detection and electronic-processing means, and even at a distance from the optical-pumping source of the laser when the laser is optically pumped. However, in the general case when a measurement of the velocity vector is taken along three axes, this would make it necessary to use optical switches which are difficult to implement.

It has also been proposed in Patent FR-A-2 761 162 to use optical fibres and optical couplers in various parts of the system, but the architecture which results from this can operate only for very low light powers, of the order of about 1 watt. For certain applications, such as the observation of velocities at a large distance and at high altitude, these powers are much too weak and powers at least ten times higher are desired.

The invention consequently provides a novel general architecture of a laser anemometer, allowing greater installation flexibility, ease of production, but nevertheless a sufficient emission power, while furthermore taking into account other technical constraints inherent in optical and electronic systems (minimizing the optical noise and the electronic noise, for example) and while of course taking into account cost constraints, in particular for mass production.

SUMMARY OF THE INVENTION

For this purpose, a laser anemometer is provided which includes at least one laser source, an optical emission and reception system, making it possible, on the one hand, to emit a laser beam coming from the source towards particles in suspension in a medium in motion with respect to the anemometer and, on the other hand, to receive and transmit radiation back-scattered by the particles, an optical mixer for mixing a reference laser beam, representing the beam emitted by the optical system, with the radiation received and transmitted by the optical system, at least one photosensitive detector for detecting the energy of the radiation at the output of the mixer, and an electronic processing system for calculating the relative velocity of the medium in motion with respect to the anemometer as a function of the frequency components present in the output signal of the detector, this anemometer being characterized in that the optical emission and reception system as well as the mixer are carried by the same support, the laser source is located remotely from the source and is connected to the optical system by at least one optical fibre, and the detector is located remotely from the support and connected to the output of the mixer by an optical fibre, the main emission channel of the emission and reception system carried by the support being produced with the aid of unguided optics.

The support of the optical system and of the mixer will be referred to below by the expression support "panel" for convenience, but without thereby implying any particular shape of this support; whether it is in the form of a plate or the like will depend on the circumstances of production and use which are envisaged.

Hence, only the emission-reception optics and the optical mixer are situated on a support panel which will need to be placed at a position dictated by the constraints of the application: for an aircraft, for example, the constraints due to the structure of the aircraft mean that there is little choice of position (and space available at these positions) in order to be able to emit laser beams in the desired directions. With current technology, the size of this panel can then be limited to about 15×8×5 cm$^3$. This panel may be placed in immediate proximity to the outer surface (or "skin") of the aircraft, the rest of the anemometer being remotely located at positions where there is more space. With the old architectures, much more space was needed in proximity to the outer surface of the aircraft, precisely where this space is often unavailable.

Furthermore, the panel carries the main emission channel of the beam which is emitted by the laser source and received through an optical fibre, but this main emission channel does not include guided optical elements, such as circulators or optical couplers, which would be incompatible with the powers of the order of 20 watts which it is desired to emit. In practice, it consists essentially of lenses, transparent plates and prisms or splitter plates or semitransparent return mirrors, which transmit the emitted beam and redirect the reflected beam.

Another advantage is the total absence of electrical components or connections on this panel, which makes it insensitive to electromagnetic interference.

For an anemometer which measures along a plurality of axes, use will be made of a plurality of panels each carrying one set of emission and reception optics and one optical mixer. The laser sources are remotely located and connected to each of the panels by at least one respective optical fibre, and the detectors (which are not necessarily at the same position as the sources) are each connected to one of the panels by at least one respective optical fibre. The panels may be geographically separated from one another—for example, in an aircraft, a first panel on the port side, another on the starboard side and the third high up in the cabin. However, they may also be carried by the same structure, for example placed in the front of the aircraft, this structure then preferably having orientation adjustment means making it possible to adjust the orientations of each set of emission-reception optics to a desired value with respect to the structure (and therefore with respect to the aircraft).

With the architecture according to the invention, it is now furthermore possible to use optical and electronic components which are less and less expensive because of their large-scale use in the field of telecommunications, such as optical fibres, their positioning systems and their connectors, optical-fibre couplers which can be used as optical mixers, etc. (except for the main emission channel).

Sources operating at the wavelengths used in telecommunications will preferably be used as the laser sources, in particular semiconductor lasers and solid-state (or fibre-optic) lasers doped with erbium, emitting at wavelengths in the region of 1.5 micrometres which are not dangerous for the eye.

Preferably, the laser source is connected to the emission optics by a first polarization-preserving single-mode optical fibre, this first optical fibre carrying the majority of the energy from the laser source, and by a second optical fibre, preferably also single-mode and polarization-preserving, to an input of the optical mixer situated on the panel. This second fibre carries a small fraction of the laser power to the mixer.

The mixer may furthermore have two output channels and be connected to two separate (remotely located) detectors by two optical fibres, especially when it is desired to use a balanced-detection principle making it possible to reduce the noise due, in particular, to the fluctuations of the laser source.

BRIEF DESCRIPTION OF THE DRAWINGS

Other characteristics and advantages of the invention will become apparent on reading the following detailed description which is given with reference to the appended drawings, in which.

DETAILED DESCRIPTION OF THE INVENTION

Figure 1:
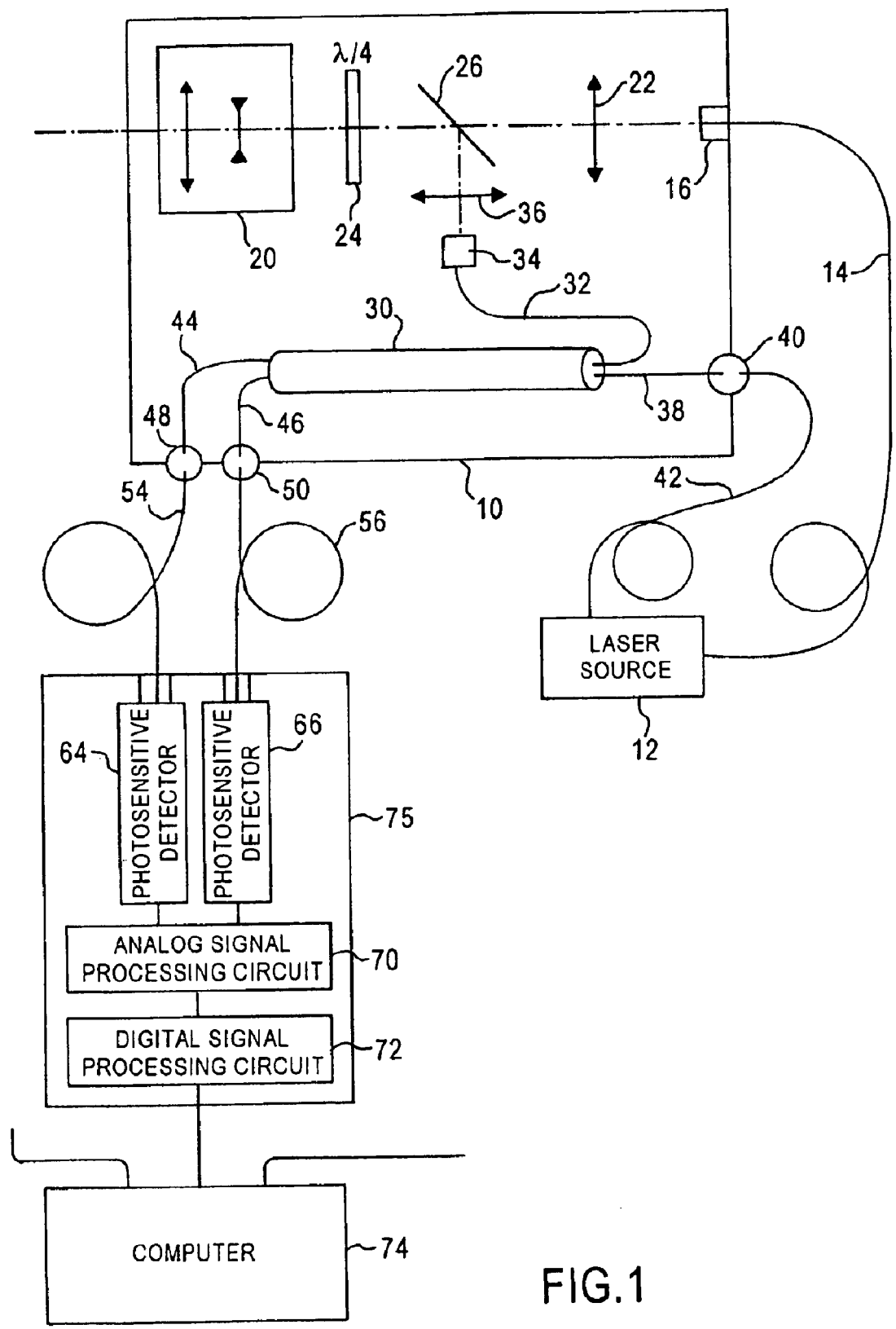
FIG. 1 represents the laser anemometry system according to the invention.

The laser anemometry system includes a support panel 10 carrying the optics for emission and reception of a laser beam, but not carrying the laser source from which this beam originates. The laser source 12 is remotely located so as to be situated at a different position, and it is connected to the panel by an optical fibre 14. This fibre is preferably of the single-mode and polarization-preserving type in order to conserve the polarization of the beam, the polarization being useful in particular for splitting the emission beam and the return beam inside the emission and reception optics (this splitting is carried out by a birefringent plate, as will be seen).

The fibre end connected to the panel is carried by a holding head 16, preferably with means (not shown) for adjusting the position of this head on the panel.

The emission and reception optics comprise the elements conventionally needed for producing a laser beam focused at a distance of about fifty metres. These optics have been represented in the form of an afocal objective 20 (schematically a diverging lens followed by a converging lens). The emission optics may also comprise an additional lens 22 placed between the objective 20 and the head 16 of the optical fibre 14 conveying the laser beam. A quarter-wave plate 24 and a polarization-splitter plate 26, which is transparent for one polarization and reflective for the other, are situated between the objective 20 and the lens 22. All these elements are carried by the panel 10. They are free-propagation optical elements and not guided optical elements.

The laser beam conveyed from the laser source 12 by the optical fibre 14 travels successively

- into the lens 22 where it is collimated, the position adjustment of the holding head 16 placing the end of the fibre 14 at the focus of the lens;
- through the splitter plate 26, which is transparent for the linear polarization of the beam arriving via the fibre 14;
- through the quarter-wave plate 24 which converts the linear polarization of the beam into circular polarization;
- through the afocal objective 20 which transmits it towards the atmosphere while focusing it into a measurement volume at a large distance from the emission optics.

A power of about 20 watts can pass through these elements without difficulty.

The coherent light back-scattered by the particles situated in the measurement volume has a circular polarization opposite to that of the emitted beam; it returns through the objective 20 and through the quarter-wave plate 24, where its circular polarization is converted into linear polarization opposite to the original one; because of this opposite polarization, the return light is entirely reflected by the splitter plate 26 towards an end of an optical fibre 32 constituting a first input of a fibre-optic coupler 30. The end of the fibre 32 is carried by a holding head 34 provided with means for adjusting its position on the panel. A converging lens 36 may be provided between the plate 26 and the holding head 34 in order to focus the return beam onto the end of the fibre 32 held in this way.

The elements 20, 24 and 26 are common to the emission and reception paths of the emission and reception optics; the elements 16 and 22 are specific to the emission path; and the elements 34 and 36 are specific to the reception path. They are all carried by the panel 10.

The fibre-optic coupler 30 is also carried by the panel 10. This coupler is used as an optical mixer intended to mix a fraction of the initial laser beam with the returning coherent light conveyed by the optical fibre 32. For this purpose, the coupler includes a second input optical fibre 38 which is connected to a fibre-optic connector 40 situated on the panel 10. The connector 40 is connected to an optical fibre 42, preferably a single-mode polarization-preserving fibre, which conveys a small fraction of the coherent light of the laser from the remotely located laser source 12. Such a fibre-optic coupler, therefore operating as guided optics, can be used here because the light power circulating in the reception channel is much weaker than that which circulates in the main emission channel.

In practice, the laser source 12 may consist of a small low-power laser followed by one or more amplifier stages with doped (most often with erbium) optical fibres; the small low-power laser is a laser diode of the DFB diode type ("distributed feedback diode", that is to say a Bragg-grating laser diode), or a bar laser of the microchip laser type, that is to say a very small solid-bar laser. In this type of design, the output of the doped fibre-optic amplifiers is transmitted onto the main fibre 14, and a small fraction of laser energy is sampled from the output of the low-power laser, before amplification or in an intermediate stage, in order to be sent onto the fibre 42.

The fibre-optic coupler, which consists of the two optical fibres 32 and 38, fused together over a length of a few centimetres and embedded in a resin, mixes together two coherent electromagnetic waves, one of which (on the fibre 38) is at the laser frequency of the source and the other of which (on the fibre 32) is at a frequency shifted by Doppler effect as a function of the velocity of the particles which have returned the light to the source. The wave which is at the laser frequency of the source may optionally be shifted by a frequency translator such as an acousto-optic modulator; this then makes it possible to ascertain the sign of the velocity as well.

Beating takes place in the optical coupler, and the energy propagated in the output optical fibre or fibres of the coupler 30 has maxima and minima at this beat frequency.

This energy is conveyed to a light-sensitive detector which will produce electrical signals containing the beat frequency.

In the example of the figure, two different detectors are provided which are connected to two symmetrical outputs of the coupler 30. The outputs of the coupler, which consist of the extensions 44 and 46 of the input fibres 32 and 38, are connected to two fibre-optic connectors 48 and 50 respectively. The connector 48 couples the fibre 44 to an optical fibre 54, and the connector 50 couples the optical fibre 46 to another optical fibre 56. The optical fibres 54 and 56 transmit the reception laser beam, with its energy beats, to respective detectors 64 and 66. The fibres 54 and 56 do not need to be single-mode polarization-preserving fibres. They are simple multimode fibres.

The detectors 64 and 66 deliver electrical signals at a frequency corresponding to the beats of the emission laser beam and the reception laser beam. A single detector might be sufficient for exploiting the optical information, but with two detectors it is possible to carry out balanced detection making it possible to eliminate certain noise.

The signals coming from the detectors are applied to analogue (70) and fast digital (72) signal-processing circuits, the fast digital processing circuits providing digital information useful for the velocity determination.

The velocity determination is then carried out in a computer 74 on the basis of this digital information.

The particles illuminated by the laser beam have random frequencies in the illumination direction, but, statistically, they have an average velocity corresponding to the relative velocity between the anemometer and the air. The computer processes the received signals in order to extract significant data pertaining to the frequency spectra of the signals detected by the detectors.

The detectors and the analogue and fast digital signal-processing circuits 70 and 72 are carried by one or more printed-circuit boards 75, located remotely from the panel 10 and connected to the panel by the fibres 54 and 56.

In the general case, it is desired to determine the velocity along three different axes, which are preferably orthogonal, in order to obtain a complete velocity vector. In this case, the complete measurement system includes three (preferably strictly identical) panels 10, three preferably identical printed-circuit boards 75 carrying the detectors and electronic circuits corresponding to each panel, three identical laser sources 12, and a single computer 74 processing the signals from all three boards. This modularity facilitates use in different applications.

In an aircraft velocity measurement application, only the panels 10 will be placed in proximity to the skin of the aircraft, it being possible to place all the other elements at positions where there is more space.

The panels may then be placed at different positions in the aircraft, or alternatively at a single position in front of which three axes with long-range visibility are available. In this case, all three panels may be fitted on a common support provided with precision adjustment means making it possible to orientate the emission optics precisely in the desired directions.

In the embodiment described in FIG. 1, the optical mixer used is a fibre-optic coupler which receives a fraction of the beam from the laser source 12 via the optical fibre 42.

Figure 2:
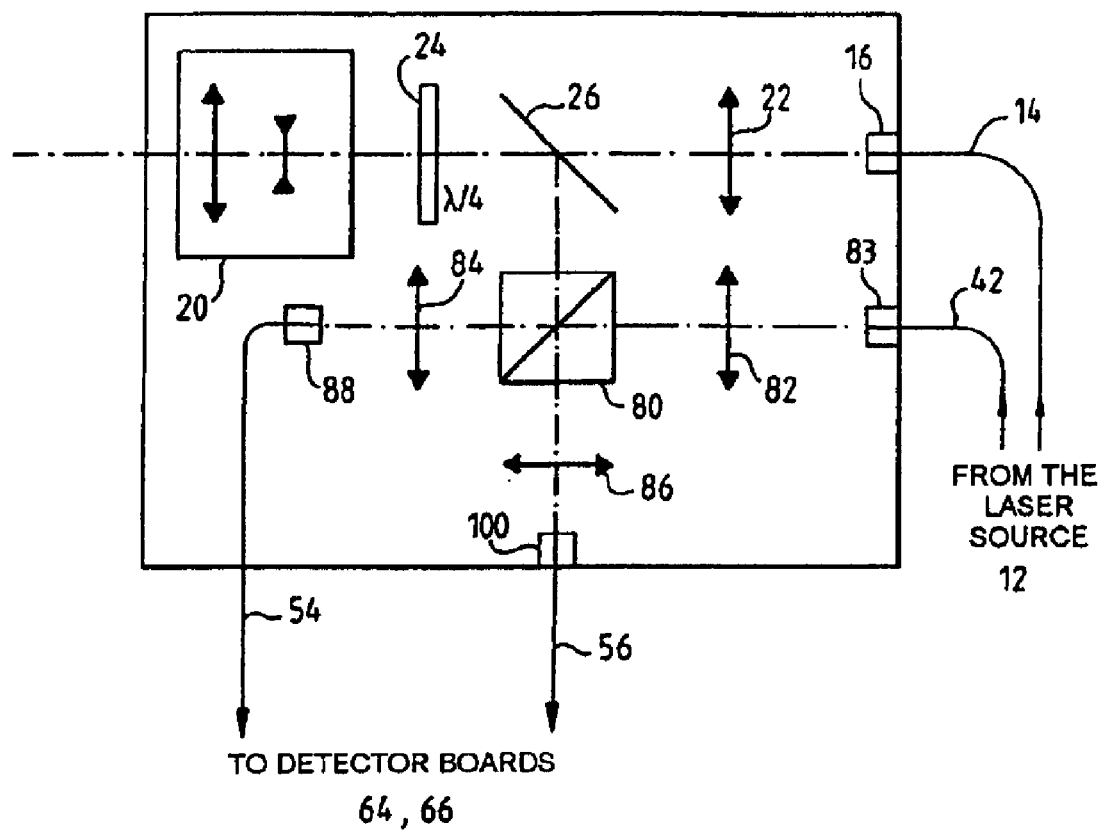
FIG. 2 represents an alternative embodiment.

FIG. 2 represents an alternative embodiment in which the optical mixer consists not of a fibre-optic coupler, but of a mixer cube 80. In this case, the splitter plate 26 sends the return beam back towards a first entry face of the cube. The reference beam coming from the optical fibre 42 (originating from the remotely located laser source 12) is conveyed by a lens 82 (similar to the converging lens 22 in FIG. 1) onto another entry face of the cube. The cube has a semireflective diagonal surface (reflection power equal to the transmission power in the case when two detectors are used and there is therefore symmetrical extraction on both exit faces of the cube). A holding head 83, whose position is preferably adjustable, makes it possible to hold the end of the fibre 42 at the focus of the lens 82, in the same way as the head 16 holds the fibre 14 at the focus of the lens 22. The elements 16, 20, 22, 24, 26 are the same as in FIG. 1, and fulfill the same role.

The beam emerging through one exit face of the cube is a mixture of the return beam originating from the reception optics and the reference beam coming from the fibre 42.

Focusing optics (converging lens 84 for one of the exit faces, 86 for the other) focuses the mixed beam onto the end of an optical fibre 54 (or 56) going to the detector 64 (or 66). The ends of the fibres 54 and 56 are held in holding heads 88 and 100; the positions of these heads can be adjusted so that the end of the fibre is situated at the focus of the converging lenses 84 and 86. The fibres 54 and 56 are multimode fibres.

In this embodiment, there is no need for the fibre-optic connectors 40, 48 and 50 which there were in FIG. 1. These connectors are replaced by simple heads for holding and positioning the fibre ends. There is need, however, for a mixer cube 80 and the focusing optics 84 and 86.

A frequency translator such as an acousto-optic modulator may be added on the channel 42, preferably in the laser source 12 or in proximity to it, in applications for which the sign of the velocity needs to be known (helicopter).

What is claimed is:

1. An air speed longitudinal laser anemometer for use on board an aircraft to measure an airspeed of the aircraft, comprising:
    at least one laser source;
    an optical emission and reception system for emitting a laser beam coming from the source towards particles in suspension in the air outside the aircraft and for receiving and transmitting radiation back-scattered by the particles;
    an optical mixer for mixing a reference laser beam, representing the beam emitted by the optical system, with the radiation received and transmitted by the optical system;
    a photosensitive detector for detecting the energy of the radiation at the output of the mixer;
    an electronic processing system for calculating the relative velocity of the medium in motion with respect to the anemometer as a function of the frequency components present in the output signal of the detector;
    the optical emission and reception system as well as the mixer are carried by a same support, the laser source is located remotely from the source and is connected to the optical system an optical fiber, and the detector is located remotely from the support and connected to the output of the mixer by an optical fiber, the main emission channel of the emission and reception system carried by the support being produced with the aid of unguided optics.

2. The anemometer according to claim 1, wherein the anemometer has, for measuring velocity along a plurality of axis, a plurality of supports each carrying an optical emission and reception system and an optical mixer, the anemometer having a plurality of remotely located laser sources which are each connected to a respective optical system by at least one optical fiber, and a plurality of detectors which are each connected to a respective mixer by at least one optical fiber.

3. The anemometer according to claim 2, wherein the supports are carried by the same structure, which has orientation adjustment means making it possible to adjust the orientations of the various optical emission-reception systems to a desired value with respect to the structure.

4. The anemometer according to claim 2, wherein the various laser sources are identical, and in that the various supports, with their optical emission and reception system and their optical mixer, are identical.

5. The anemometer according to claim 2, wherein the detectors are each connected to a respective electronic signal-processing circuit, and in that the various signal-processing circuits are connected to a common computer provided with computation means making it possible to determine the various components of a velocity vector on the basis of digital data provided by the signal-processing circuits.

6. The anemometer according to claim 1, wherein the laser source is connected by a first polarization-preserving single-mode optical fiber to the emission optics, this first optical fiber carrying the majority of the energy from the laser source, and by a second optical fiber, preferably also single-mode and polarization-preserving, to an input of the optical mixer.

7. The anemometer according to claim 1, wherein the optical mixer has two output channels and is connected by two optical fibers to two separate detectors.

8. The anemometer according to claim 1, wherein the mixer consists of a fiber-optic coupler.

9. The anemometer according to claim 8, wherein the emission and reception optics include means for directing the received radiation towards an input of the coupler, and in that a fiber-optic connector is provided on the support of the emission and reception optics, in order to connect an optical fiber coming from the remotely located laser source to a second input of the coupler.

10. The anemometer according to claim 8, wherein a fiber-optic connector is provided on the support of the emission and reception optics, in order to connect an output of the fiber-optic coupler to an optical fiber connected to the remotely located detector.

11. The anemometer according to claim 1, wherein the laser source is a source emitting at a wavelength of about 1.5 micrometers.

12. The anemometer according to claim 3, wherein the various laser sources are identical, and in that the various supports, with their optical emission and reception system and their optical mixer, are identical.

13. The anemometer according to claim 4, wherein the detectors are each connected to a respective electronic signal-processing circuit, and in that the various signal-processing circuits are connected to a common computer provided with computation means making it possible to determine the various components of a velocity vector on the basis of digital data provided by the signal processing circuits.

14. The anemometer according to claim 5, wherein the laser source is connected by a first polarization-preserving single-mode optical fiber to the emission optics, this first optical fiber carrying the majority of the energy from the laser source, and by a second optical fiber, preferably also single-mode and polarization-preserving, to an input of the optical mixer.

15. The anemometer according to claim 4, wherein the laser source is connected by a first polarization-preserving single-mode optical fiber to the emission optics, this first optical fiber carrying the majority of the energy from the laser source, and by a second optical fiber, preferably also single-mode and polarization-preserving, to an input of the optical mixer.

16. The anemometer according to claim 5, wherein the optical mixer has two output channels and is connected by two optical fibers to two separate detectors.

17. The anemometer according to claim 6, wherein the optical mixer has two output channels and is connected by two optical fibers to two separate detectors.

18. The anemometer according to claim 9, wherein a fiber-optic connector is provided on the support of the emission and reception optics, in order to connect an output of the fiber-optic coupler to an optical fiber connected to the remotely located detector.

19. The anemometer according to claim 8, wherein the laser source is a source emitting at a wavelength of about 1.5 micrometers.

20. The anemometer according to claim 3, wherein a fiber-optic connector is provided on the support of the emission and reception optics, in order to connect an output of the fiber-optic coupler to an optical fiber connected to the remotely located detector.

* * * * *